United States Patent
Zuo et al.

(10) Patent No.: US 12,397,386 B2
(45) Date of Patent: Aug. 26, 2025

(54) DEVICE AND METHOD FOR AUTOMATICALLY EXTRUDING AND INSTALLING ELECTROMAGNETIC-LOADED INTERFERENCE THREADED CONNECTION COMPONENT

(71) Applicant: CIVIL AVIATION FLIGHT UNIVERSITY OF CHINA, Deyang (CN)

(72) Inventors: Douquan Zuo, Mianyang (CN); Jie Liu, Chongqing (CN); Yaoming Fu, Deyang (CN); Guoling Ma, Yuncheng (CN); Shaoqing Jin, Cangzhou (CN)

(73) Assignee: CIVIL AVIATION FLIGHT UNIVERSITY OF CHINA, Deyang (CN)

( * ) Notice: Subject to any disclaimer, the term of this patent is extended or adjusted under 35 U.S.C. 154(b) by 0 days.

(21) Appl. No.: 19/008,862

(22) Filed: Jan. 3, 2025

(65) Prior Publication Data
US 2025/0135590 A1 May 1, 2025

Related U.S. Application Data

(63) Continuation of application No. PCT/CN2024/098863, filed on Jun. 13, 2024.

(30) Foreign Application Priority Data

May 30, 2023 (CN) .......................... 202310624693.0

(51) Int. Cl.
B23P 19/06 (2006.01)

(52) U.S. Cl.
CPC .................................. *B23P 19/06* (2013.01)

(58) Field of Classification Search
CPC .......... B23P 19/02; B23P 19/06; B23P 19/062
See application file for complete search history.

(56) References Cited

FOREIGN PATENT DOCUMENTS

| CN | 201664846 U | 12/2010 | |
|---|---|---|---|
| CN | 103612115 B | 3/2014 | |
| CN | 105690065 A | 6/2016 | |
| CN | 206732638 U | 12/2017 | |
| CN | 105690065 B | * 9/2018 | .............. B23P 19/02 |
| CN | 110355321 B | 10/2019 | |
| CN | 210099439 U | 2/2020 | |
| CN | 111843435 B | 10/2020 | |

(Continued)

OTHER PUBLICATIONS

Kang, Yong-Gang; CN-105690065-B Machine Translation (Year: 2016).*

(Continued)

*Primary Examiner* — Lee A Holly
(74) *Attorney, Agent, or Firm* — JEEN IP LAW, LLC

(57) ABSTRACT

A device and a method for automatically extruding and installing an electromagnetic-loaded interference threaded connection component are provided, where the device includes a base, and a U-shaped frame and a console are fixedly connected at a top of the base; the console is located inside the U-shaped frame, and an overlapping plate group is stored at a top of the console; a front of the U-shaped frame is provided with a control panel.

3 Claims, 13 Drawing Sheets

(56) References Cited

FOREIGN PATENT DOCUMENTS

| CN | 112378785 B | 2/2021 |
|----|-------------|--------|
| CN | 113714851 A | 11/2021 |
| CN | 114932400 B | 8/2022 |
| CN | 218193607 U | 1/2023 |
| CN | 116038310 A | 5/2023 |
| CN | 116460562 B | 7/2023 |
| JP | H09108958 A | 4/1997 |
| JP | 2012086341 A | 5/2012 |
| JP | 2015000462 B2 | 1/2015 |

OTHER PUBLICATIONS

Zhang Yanzhao, Cao Zengqiang, Qiu Jianping, Zheng Pengyu, "Analyzing Factors that Influence the Installation Quality of Interference-fit Hi-lock Bolt Connection" Mechanical Science and Technology for Aerospace Engineering No. 8, Aug. 15, 2012 (Aug. 15, 2012), Full Text.

Yang Xiaona et al. "Experimental study on the installation process of titanium alloy interference bolts based on stress wave loading" Journal of Northwestern Polytechnical University, vol. 35, No. 3, Jun. 30, 2017 (Jun. 30, 2017), pp. 462-468, ISSN: 1000-2758, p. 462, Section 1.1 to p. 463, Section 2.1.

\* cited by examiner

DEVICE AND METHOD FOR AUTOMATICALLY EXTRUDING AND INSTALLING ELECTROMAGNETIC-LOADED INTERFERENCE THREADED CONNECTION COMPONENT

CROSS-REFERENCE TO RELATED APPLICATIONS

This application is a continuation of PCT/CN2024/098863, filed on Jun. 13, 2024 and claims priority of Chinese Patent Application No. 202310624693.0, filed on May 30, 2023, the entire contents of which are incorporated herein by reference.

TECHNICAL FIELD

The disclosure relates to the technical field of threaded connection component extrusion, and in particular to a device and a method for automatically extruding and installing an electromagnetic-loaded interference threaded connection component.

BACKGROUND

Electromagnetic-loaded means that the capacitor is used for charging, and the capacitor is discharged with the setting of the required voltage. The coil of the driving head passes through the current, forming eddy current, generating magnetic field, and the magnetic force is repelled at the same level, generating driving force, impacting the high lock bolt and forming automatic extrusion installing. When two composite laminates or titanium alloy plates for aviation are overlapped in different kinds, electromagnetic-loaded equipment is generally used for interference connection, which is also called interference fit assembly.

Interference of interference extrusion installing refers to the fit between bolt interference fit polished rod part and connecting plate hole; the diameter of the polished rod is a little larger than the hole. For the traditional pneumatic loading mode, the general interference amount of metal interference installing is 0.05%-1.5%, and the general interference amount of composite material installing is 0.05%-1.2%. Interference amount is the percentage of the difference between the hole diameter and the polished rod diameter and the polished rod diameter. However, the existing electromagnetic-loaded extrusion devices mostly use electromagnetic-loaded guns to impact the high-lock bolts. By clicking the discharge button, millisecond impact loading may be carried out, which will realize the interference extrusion installing of the bare rod part of the high-lock bolts on two overlapping plates, and the maximum interference amount of interference installing may reach 2.5%.

In the related art, the existing electromagnetic-loaded gun has some defects in the process of extruding and installing the overlapping plate. For example, when the electromagnetic-loaded gun impacts the high lock bolt, the stability and positioning between the high lock bolt and the overlapping plate cannot be guaranteed. However, in the prior art, although there is a fixing mechanism for fastening the overlapping plate, the fastening mechanism may not realize the synchronous positioning processing of the high lock bolt and the overlapping plate, so that the high lock bolt is prone to slight deviation or the high lock bolt may not accurately correspond to the connecting hole on the overlapping plate during electromagnetic-loaded impact, thereby reducing the subsequent interference fit assembly effect.

SUMMARY

(1) Technical Problems to be Solved

Aiming at the shortcomings of the prior art, the disclosure provides a device and a method for automatically extruding and installing an electromagnetic-loaded interference threaded connection component, which not only clamp the two sides of stacked overlapping plates, but also position the connecting holes of multiple overlapping plates, so as to ensure that the connecting holes overlap and improve the positioning of subsequent high-lock bolt insertion. The arrangement of the impact assembly may elastically position and clamp the end cap part of the high lock bolt, so as to ensure the stability of the high lock bolt and ensure the high lock bolt to be vertically downward, and avoid the problem that the high lock bolt inclines and affects the interference fit assembly effect.

(2) Technical Scheme

In order to achieve the above purpose, the disclosure provides the following technical scheme: a device for automatically extruding and installing an electromagnetic-loaded interference threaded connection component, including a base, where a U-shaped frame and a console are fixedly connected at a top of the base; the console is located inside the U-shaped frame, and an overlapping plate group is stored at a top of the console; a front of the U-shaped frame is provided with a control panel, a lifting plate is connected between two sides of an inner wall of the U-shaped frame in a sliding way, an electromagnetic-loaded assembly is arranged on the lifting plate, both sides of a top of the U-shaped frame are fixedly connected with first electric telescopic rods, and telescopic ends of the two first electric telescopic rods are fixed on a top of the lifting plate; where an impact end of the electromagnetic-loaded assembly is detachably provided with an impact assembly for positioning a high lock bolt, and both sides of a bottom of the lifting plate are provided with reinforcing assemblies for fastening the overlapping plate group located on the console; clamping plates for clamping two sides of the overlapping plate group are slidably connected to both sides of the top of the console, and a bottom of the U-shaped frame is provided with a driving assembly for horizontally driving two groups of the clamping plates; an inside of the base is fixedly connected with a sleeve, and an inside of the sleeve is provided with a positioning assembly for positioning connecting holes on the overlapping plate group; the console is internally provided with a through hole.

Optionally, the electromagnetic-loaded assembly includes a housing fixed in the lifting plate; a movable plate and a driving plate are respectively arranged in the housing, and an impact head is installed at a bottom of the driving plate; a bottom of the impact head is provided with a installing hole, and an inside of the installing hole is provided with internal threads; an inner surface of the installing hole is fixedly connected with a T-shaped impact rod, and a bottom end of the T-shaped impact rod extends to a bottom of the installing hole; a tension spring is fixedly connected between a top of the T-shaped impact rod and a top of the installing hole.

Optionally, opposite sides of the movable plate and the driving plate are respectively provided with a loading coil and an induction coil, and multiple buffers are arranged between a top of the movable plate and a top of an inner wall of the housing; an inside of the impact head is provided with a guiding groove; an inside of the guiding groove is connected with a guiding plate in a sliding way, and a top of the guiding plate is fixedly connected with a guiding rod; a top end of the guiding rod is fixed on the top of the inner wall of the housing.

Optionally, the impact assembly includes an annular plate, and a top of the annular plate is fixedly connected with a threaded sleeve inserted into the installing hole; a bottom of the annular plate is provided with at least three hidden openings, and an outer surface of the annular plate is provided with three movable grooves; the bottom of the annular plate is fixedly connected with three abutting rods, and positioning pieces are arranged in the three movable grooves.

Optionally, each of the positioning pieces includes a rotating shaft rotating in each of the movable groove; an outer surface of the rotating shaft is fixedly connected with a T-shaped block; a bottom of the T-shaped block is fixedly connected with a V-shaped positioning block; a rotating end of the rotating shaft is provided with a torsion spring.

Optionally, each of the reinforcing assemblies includes a U-shaped frame fixed on a side of the bottom of the lifting plate; an inside of the U-shaped frame is slidably connected with a moving block, and a bottom of the moving block is fixedly connected with an L-shaped reinforcing block; a bottom of the L-shaped reinforcing block extends to a bottom of the U-shaped frame, and one side of the L-shaped reinforcing block is set as an inclined surface; a compression spring is fixedly connected between a top of the moving block and a top of an inner wall of the U-shaped frame.

Optionally, the positioning assembly includes a sliding block sliding inside the sleeve; a top of the sliding block is detachably provided with a positioning rod; a top end of the positioning rod extends to an outside of the sleeve, and the top end of the positioning rod is arranged in a chamfered shape; a bottom of the sleeve is fixedly connected with a telescopic cylinder, and a telescopic end of the telescopic cylinder is fixedly connected with a bottom of the sliding block; and the top of the sliding block is provided with a threaded hole, and a bottom of the positioning rod is provided with external threads.

A method for automatically extruding and installing an electromagnetic-loaded interference threaded connection component is provided, including following steps:
  S1, firstly, stacking two overlapping plates or three overlapping plates to be extruded and installed, overlapping the connecting holes on multiple overlapping plates to form an overlapping plate group, and driving the sliding block to be inserted into the connecting holes by overlapping multiple the overlapping plates through the telescopic cylinder for positioning;
  S2, driving two groups of clamping plates to move in opposite directions through a driving assembly, clamping and reinforcing a whole body at both sides of the overlapping plate group, and after clamping and fixing, driving the positioning rod to retract downwards and hide through the telescopic cylinder;
  S3, inserting an end cap part of a high lock bolt required for an extrusion installing into an impact assembly, and driving a T-shaped block to turn down through an arrangement of a torsion spring, thereby driving a V-shaped positioning block to turn down to position and clamp the end cap part of the high lock bolt;
  S4, driving a lifting plate to move downwards through two first electric telescopic rods, and further driving an electromagnetic-loaded assembly and two reinforcing assemblies to move downwards; through downward movement of the two reinforcing assemblies, further positioning and clamping a position of the extrusion installing of the overlapping plate group, and inserting a threaded section of the high lock bolt into the connecting hole on the overlapping plates; and
  S5, finally, charging the capacitor with required voltage through a cable, and inducing eddy current by a loading coil when discharging to form a magnetic field; by using electromagnetic repulsion generated between the loading coil and an induction coil, moving the induction coil and an impact head downward to form millisecond impact loading; finally, performing the extrusion installing of the high locking bolt in the impact assembly in the connecting holes on the overlapping plate group, so as to form an installing work of the electromagnetic-loaded interference threaded connection component.

(3) Beneficial Effects

Compared with the prior art, the disclosure provides a device and a method for automatically extruding and installing an electromagnetic-loaded interference threaded connection component, which have the following beneficial effects.

First, according to the disclosure, the driving assembly drives two groups of clamping plates in opposite directions, so that both sides of stacked overlapping plates are clamped, and the stability of extrusion installing is improved; moreover, the positioning assembly is used for inserting into the connecting holes of the overlapping plates and positioning the connecting holes of multiple overlapping plates, so that the overlapping treatment of the connecting holes is ensured, and the positioning of subsequent high-lock bolt insertion is improved; and through the arrangement of the impact assembly, the end cap part of the high lock bolt is elastically positioned and clamped, so that the stability of the high lock bolt is ensured, the high lock bolt is ensured to be vertically downward, and the problem that the high lock bolt inclines and affects the interference fit assembly effect is avoided.

Second, according to the disclosure, the two reinforcing assemblies are installed at the bottom of the lifting plate in a symmetrical way, so that when the lifting plate moves downwards, not only the electromagnetic-loaded assembly is driven to move downwards, but also the two reinforcing assemblies are driven to move downwards synchronously, so that the L-shaped reinforcing blocks in the two reinforcing assemblies are used for pressing and positioning the two sides of the installing position of the overlapping plate group, which has the function of synchronous positioning processing, effectively avoiding the problem that the overlapping plate group deviates during extrusion installing, which affects the interference fit assembly effect, and further improving the extrusion installing.

Third, according to the disclosure, the telescopic cylinder drives the sliding block up and down, so that the positioning rod is driven to move up and down; through the upward movement of the positioning rod, the positioning rod is inserted into the connecting hole on the overlapping plate group through the through hole to form positioning treatment; moreover, because the positioning rod and the sliding block are detachably installed, it is convenient for workers to replace different types of positioning rods according to the inner diameters of the connecting holes of different overlapping plate groups, and the positioning treatment of different types of overlapping plate groups is met.

Figure 1:
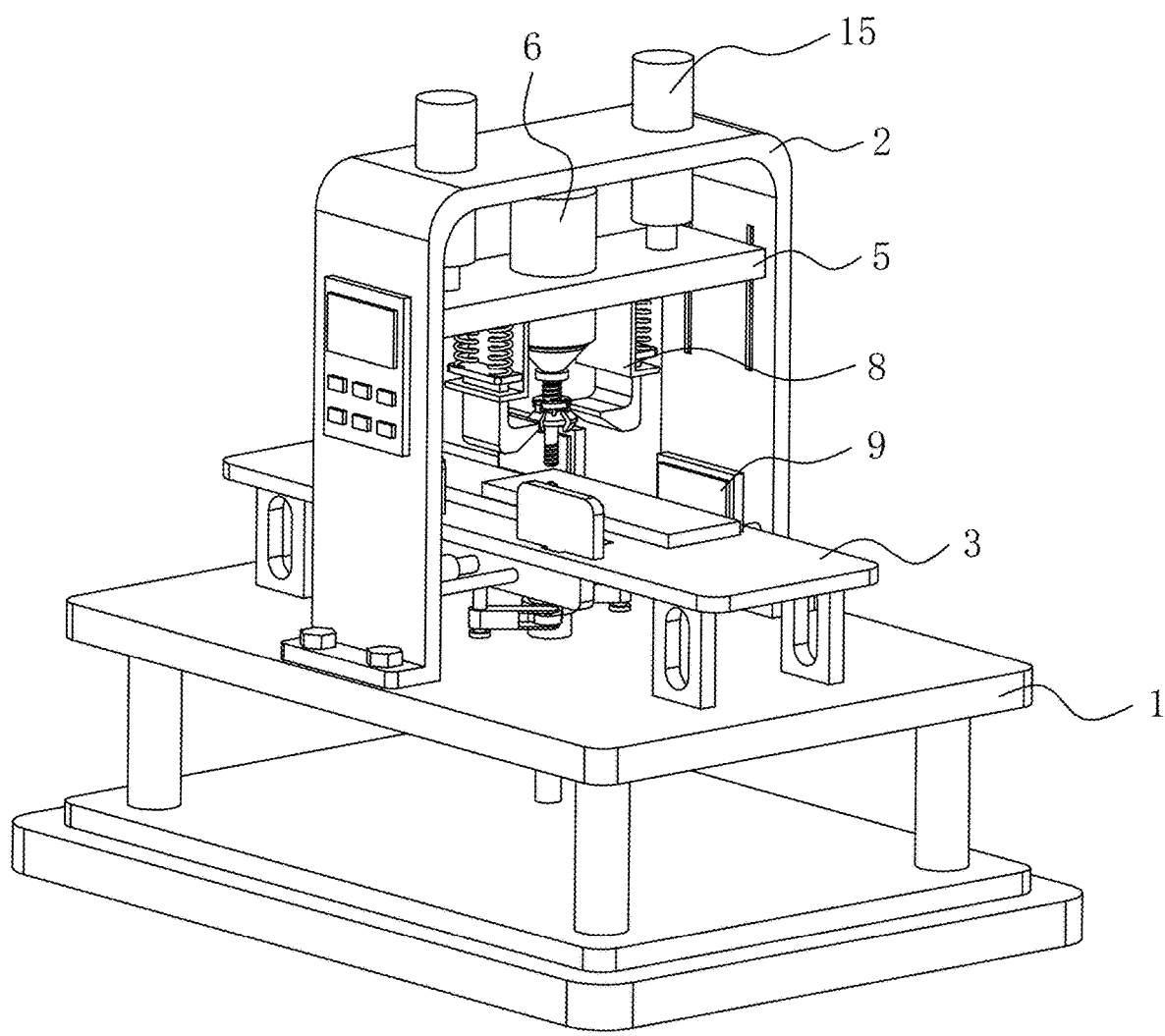
FIG. 1 is a schematic structural diagram of a device for automatically extruding and installing an electromagnetic-loaded interference threaded connection component proposed by the disclosure.
Figure 2:
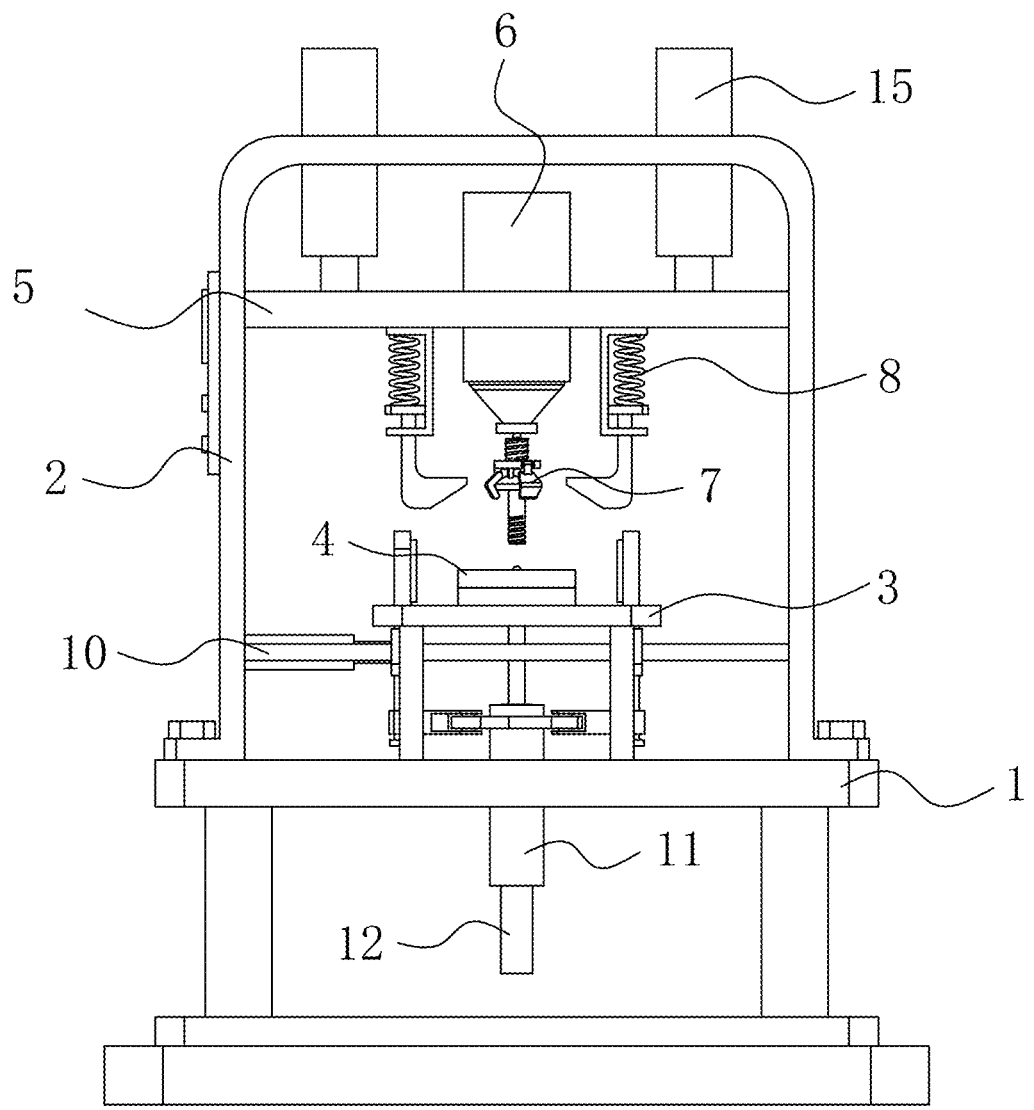
FIG. 2 is a structural side view of a device for automatically extruding and installing an electromagnetic-loaded interference threaded connection component proposed by the disclosure.
Figure 3:
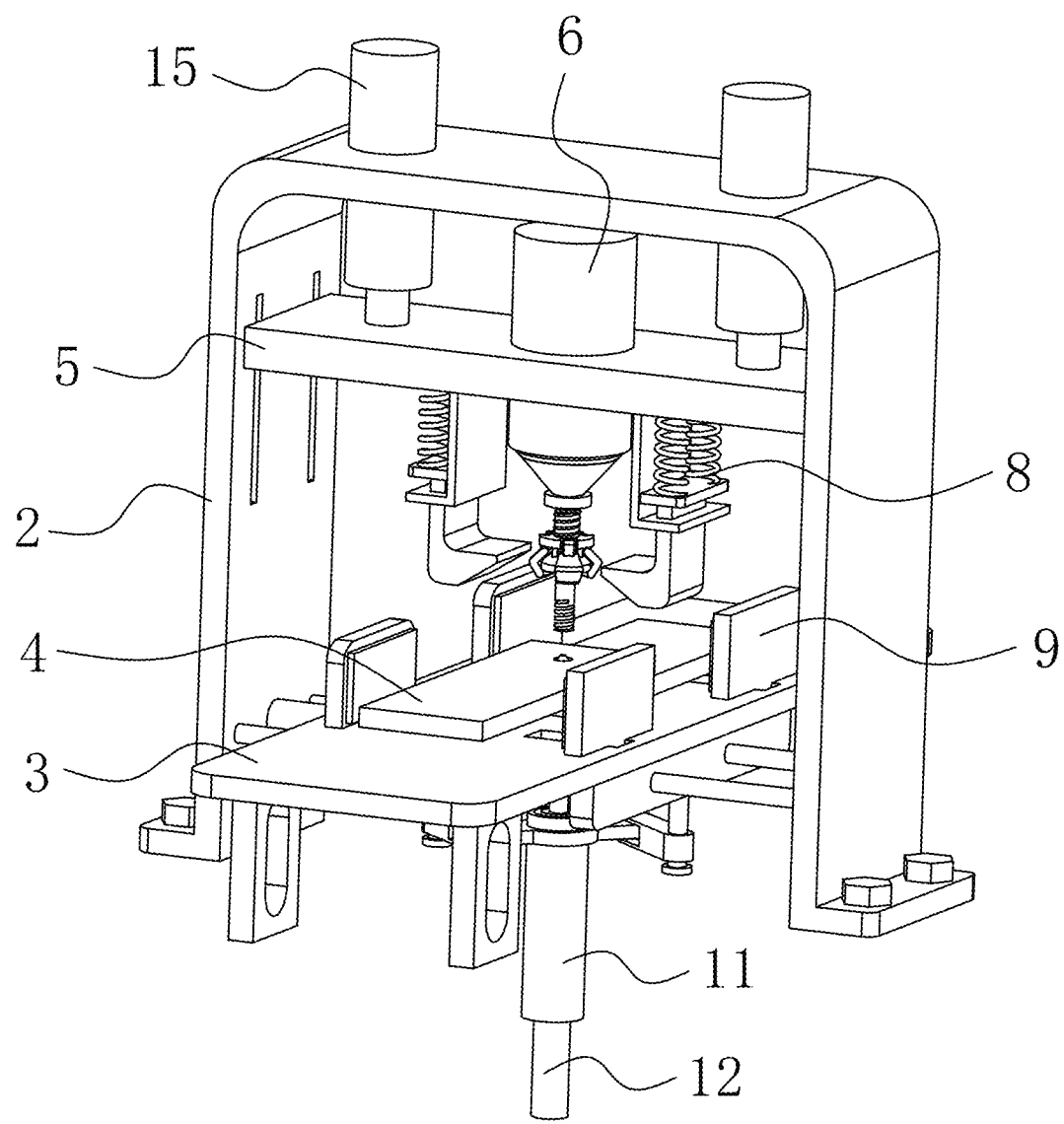
FIG. 3 is a schematic diagram of the combination of a U-shaped frame and a console in a device for automatically extruding and installing an electromagnetic-loaded interference threaded connection component proposed by the disclosure.

In the figures: 1. base; 2. U-shaped frame; 3. console; 4, overlapping plate group; 5. lifting plate;
  6. electromagnetic-loaded assembly; 61. housing; 62. movable plate; 63. driving plate; 64. impact head; 65. installing hole; 66. T-shaped impact rod; 67. tension spring; 68. loading coil; 69. induction coil; 610. buffer; 611. guiding groove; 612. guiding plate; 613, guiding rod;
  7. impact assembly; 71. annular plate; 72, threaded sleeve; 73. movable groove; 74, abutting rod; 75. rotating shaft; 76. T-shaped block; 77. V-shaped positioning block;
  8. reinforcing assembly; 81. U-shaped frame; 82. moving block; 83. L-shaped reinforcing block; 84. compression spring;
  9. clamping plate;
  10. driving assembly; 101, guiding rod; 102. sliding frame; 103. second electric telescopic rod; 104, connecting frame; 105, conversion plate;
  11. sleeve;
  12. positioning assembly; 121. sliding block; 122. positioning rod; 123, telescopic cylinder;
  13. through hole; 14, high lock bolt; 15. first electric telescopic rod.

DESCRIPTION OF EMBODIMENTS

In the following, the technical scheme in the embodiment of the disclosure will be clearly and completely described with reference to the attached drawings. Obviously, the described embodiment is only a part of the embodiment of the disclosure, but not the whole embodiment. Based on the embodiments in the present disclosure, all other embodiments obtained by ordinary technicians in the field without creative labor belong to the scope of protection of the present disclosure.

Embodiment 1

As shown in FIG. 1-FIG. 13, a device for automatically extruding and installing an electromagnetic-loaded interference threaded connection component includes a base 1, where a U-shaped frame 2 and a console 3 are fixedly connected at a top of the base 1; the console 3 is located inside the U-shaped frame 2, and an overlapping plate group 4 is stored at a top of the console 3; a front of the U-shaped frame 2 is provided with a control panel, a lifting plate 5 is connected between two sides of an inner wall of the U-shaped frame 2 in a sliding way, an electromagnetic-loaded assembly 6 is arranged on the lifting plate 5, both sides of a top of the U-shaped frame 2 are fixedly connected with first electric telescopic rods 15, and telescopic ends of the two first electric telescopic rods 15 are fixed on a top of the lifting plate 5; where an impact end of the electromagnetic-loaded assembly 6 is detachably provided with an impact assembly 7 for positioning a high lock bolt 14, and both sides of a bottom of the lifting plate 5 are provided with reinforcing assemblies 8 for fastening the overlapping plate group 4 located on the console 3; clamping plates 9 for clamping two sides of the overlapping plate group 4 are slidably connected to both sides of the top of the console 3, and a bottom of the U-shaped frame 2 is provided with a driving assembly 10 for horizontally driving two groups of the clamping plates 9; an inside of the base 1 is fixedly connected with a sleeve 11, and an inside of the sleeve 11 is provided with a positioning assembly 12 for positioning connecting holes on the overlapping plate group 4; the console 3 is internally provided with a through hole 13.

By driving the two groups of clamping plates 9 in opposite directions by the driving assembly 10, the two sides of the stacked overlapping plates are clamped, and the positioning assembly 12 is arranged to be inserted into the connecting holes of the overlapping plates to position the connecting holes of multiple overlapping plates, thereby improving the overlapping effect of the connecting holes.

Through the downward impact of the electromagnetic-loaded assembly 6 on the impact assembly 7, the high lock bolt 14 below the impact assembly 7 is punched into the connecting holes on multiple overlapping plates, and the impact assembly 7 may also elastically position and clamp the end cap part of the high lock bolt 14, so as to ensure the stability of the high lock bolt 14 and the vertical downward direction of the high lock bolt 14, and avoid the problem that the high lock bolt 14 inclines and affects the interference fit assembly effect.

The center of the through hole 13 coincides with the axes of the electromagnetic-loaded assembly 6 and the impact assembly 7, so as to improve the positioning of subsequent extrusion installing.

The overlapping plate group 4 is multiple stacked overlapping plates, preferably two or three, and one side of each overlapping plate is provided with a connecting hole, which is convenient for subsequent extrusion installing by the high lock bolt 14.

Figure 6:
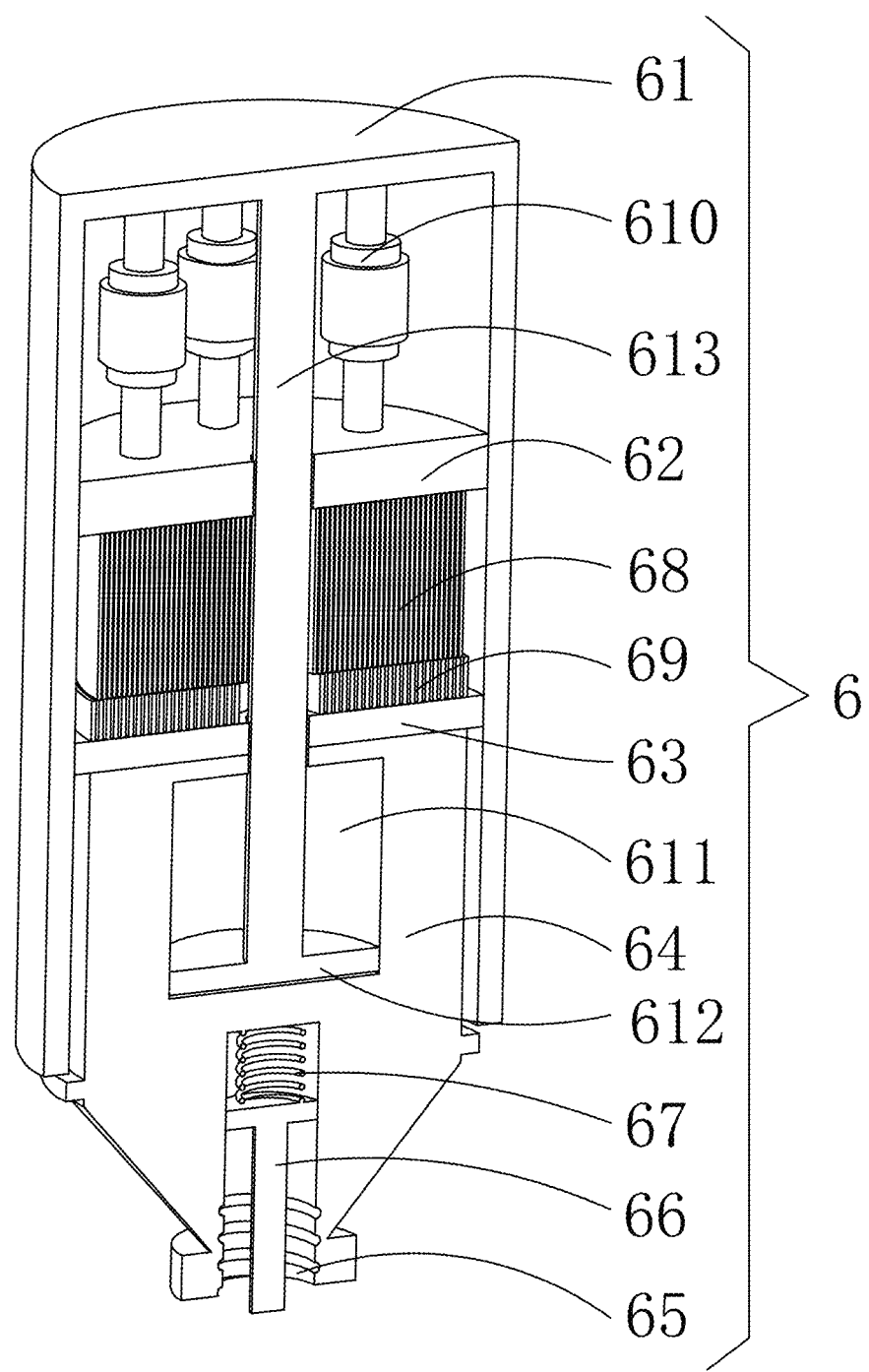
FIG. 6 is a structural sectional view of an electromagnetic-loaded assembly in a device for automatically extruding and installing an electromagnetic-loaded interference threaded connection component proposed by the disclosure.

As shown in FIG. 6, the electromagnetic-loaded assembly 6 includes a housing 61 fixed in the lifting plate 5; a movable plate 62 and a driving plate 63 are respectively arranged in the housing 61, and an impact head 64 is installed at a bottom of the driving plate 63; a bottom of the impact head 64 is provided with a installing hole 65, and an inside of the installing hole 65 is provided with internal threads; an inner surface of the installing hole 65 is fixedly connected with a T-shaped impact rod 66, and a bottom end of the T-shaped impact rod 66 extends to a bottom of the installing hole 65; a tension spring 67 is fixedly connected between a top of the T-shaped impact rod 66 and a top of the installing hole 65.

The installing hole 65 facilitates the detachable installing of the impact assembly 7 and the impact head 64, and the T-shaped impact rod 66 is arranged to press the protruding parts on one side of the three T-shaped blocks 76 in the impact assembly 7, so that the three T-shaped blocks 76 turn over and lose contact with the high lock bolt 14, so as to facilitate the extrusion installing of the high lock bolt 14, and the T-shaped impact rod 66 is driven to reset by the tension of the tension spring 67 itself;

When the impact head 64 impacts downwards, the T-shaped impact rod 66 will move downwards, and the tension spring 67 will form a certain force storage. After the impact head 64 moves downwards, the T-shaped impact rod 66 is inserted into the annular plate 71 by the inertia of the downward movement, and the protruding parts of the three T-shaped blocks 76 are pressed.

As shown in FIG. 6, opposite sides of the movable plate 62 and the driving plate 63 are respectively provided with a loading coil 68 and an induction coil 69, and multiple buffers 610 are arranged between a top of the movable plate 62 and a top of an inner wall of the housing 61; an inside of the impact head 64 is provided with a guiding groove 611; an inside of the guiding groove 611 is connected with a guiding plate 612 in a sliding way, and a top of the guiding plate 612 is fixedly connected with a guiding rod 613; a top end of the guiding rod 613 is fixed on the top of the inner wall of the housing 61.

The electromagnetic-loaded assembly 6 further includes an input power supply, a boosting transformer, a rectifying element, a current-limiting resistor and a capacitor arranged on the housing 61. When in use, it is only necessary to charge the capacitor after the input power is boosted by the boosting transformer and rectified by the rectifier element, and discharge the loading coil 68 through the cable after the discharge switch is closed after reaching the specified voltage; the electromagnetic repulsion generated between the loading coil 68 and the induction coil 69 moves the induction coil 69 and the impact head 64 downward to form millisecond impact loading. Through the downward movement of the impact head 64, the high lock bolt 14 in the impact assembly 7 is extruded and installed in the connecting holes of the overlapping plate group 4 to form the extrusion installing of multiple overlapping plates.

The guiding rod 613 is arranged to improve the guiding function of the impact head 64, and the guiding rod 613 slides in the guiding groove 611 with the guiding plate 612, so as to further improve its guiding effect and electromagnetic impact effect. The buffer 610 adopts the buffer mechanism of the prior art, which is used for buffering the high speed during loading, and preventing the device from moving forward greatly during loading, so that the recoil force is greatly reduced and the damage is prevented.

Figure 7:
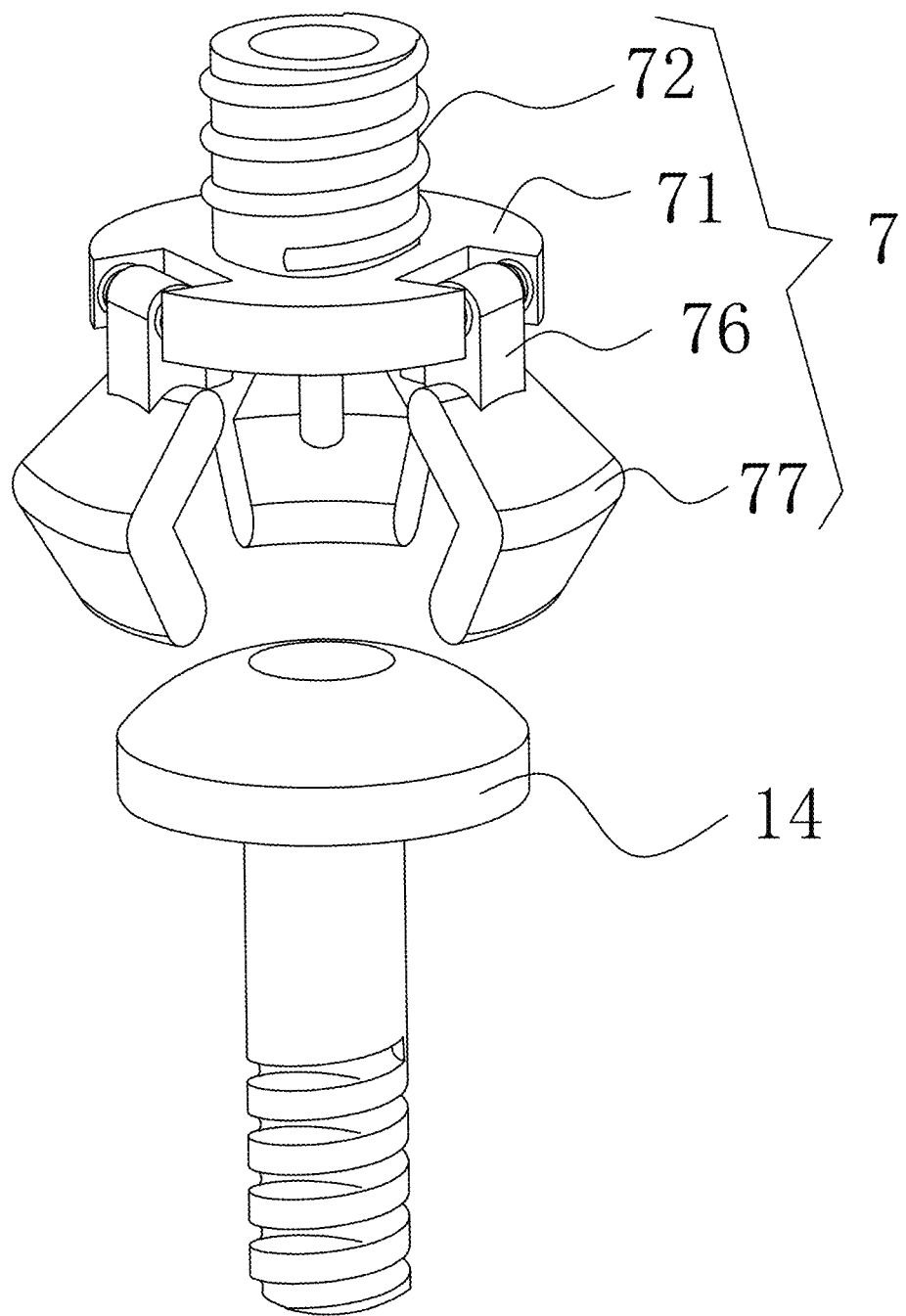
FIG. 7 is a schematic structural diagram of an impact assembly in a device for automatically extruding and installing an electromagnetic-loaded interference threaded connection component proposed by the disclosure.
Figure 8:
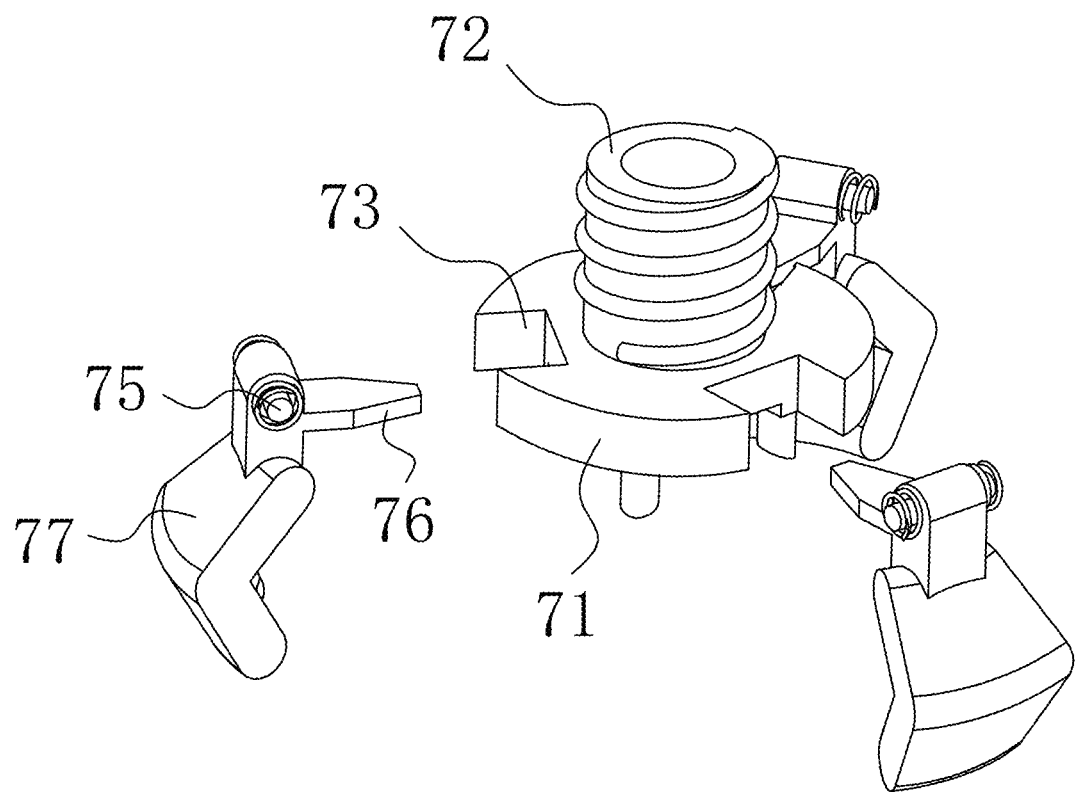
FIG. 8 is an exploded view of the structure of the impact assembly in a device for automatically extruding and installing an electromagnetic-loaded interference threaded connection component proposed by the disclosure.
Figure 9:
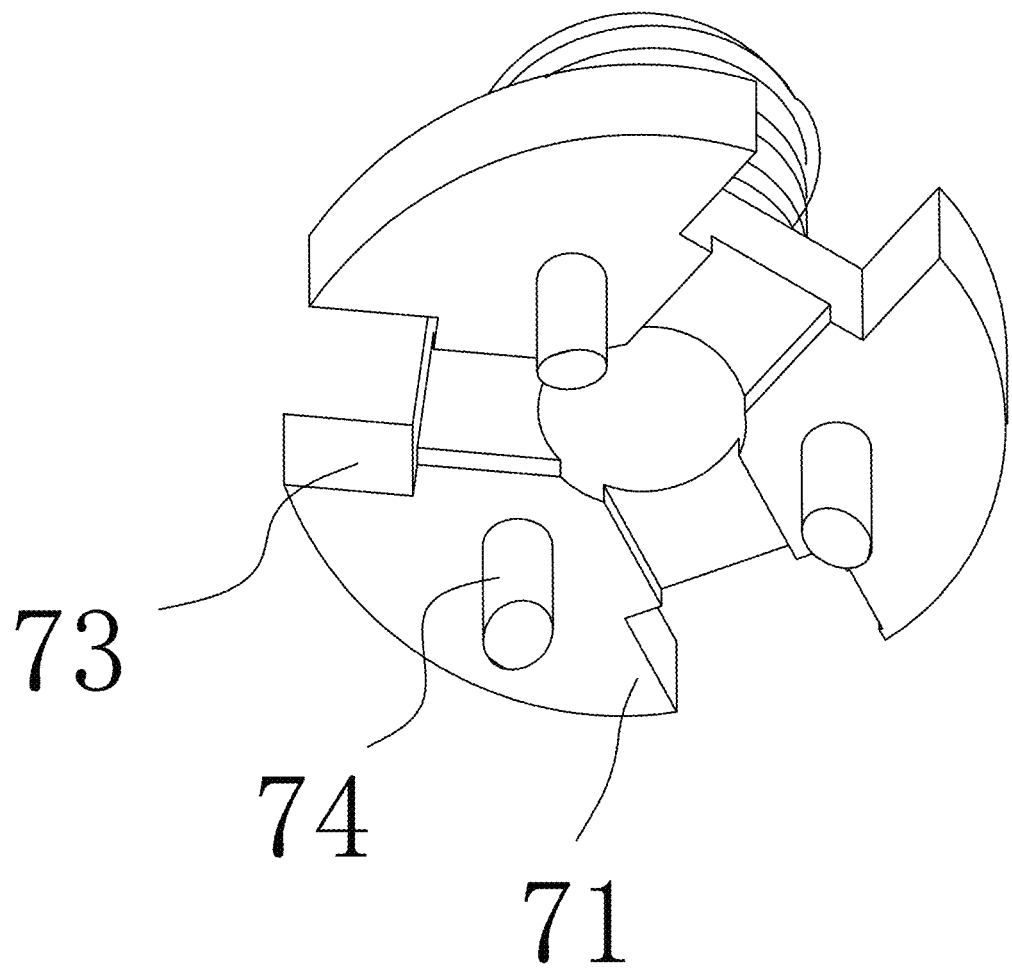
FIG. 9 is a structural bottom view of an annular plate in a device for automatically extruding and installing an electromagnetic-loaded interference threaded connection component proposed by the disclosure.
Figure 10:
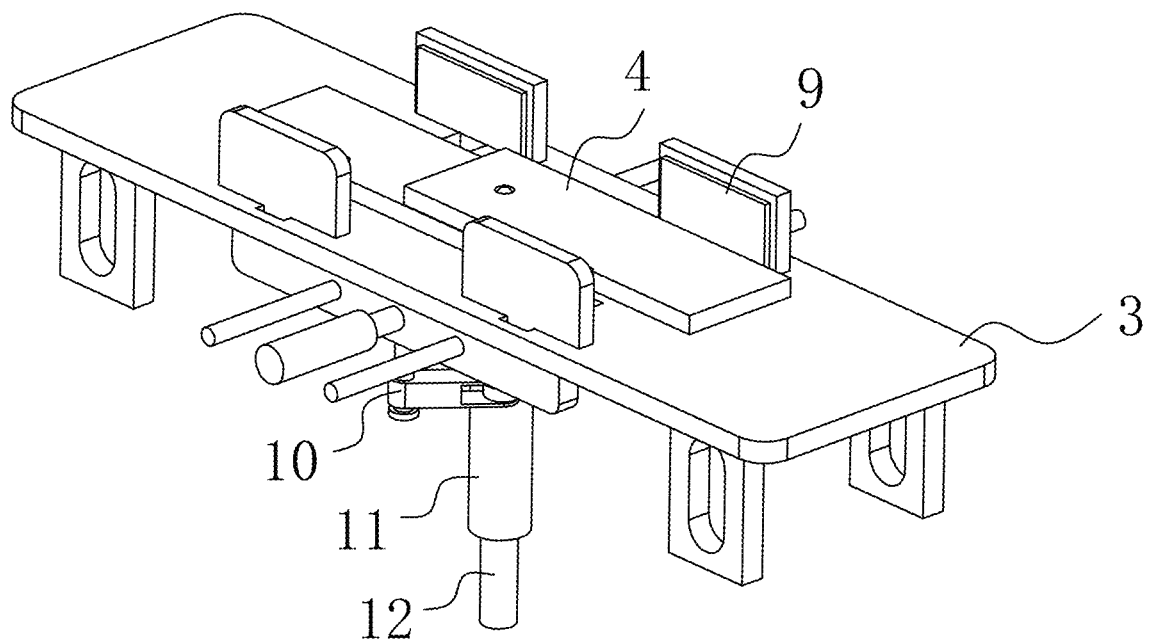
FIG. 10 is a schematic structural diagram of a console in a device for automatically extruding and installing an electromagnetic-loaded interference threaded connection component proposed by the disclosure.
Figure 11:
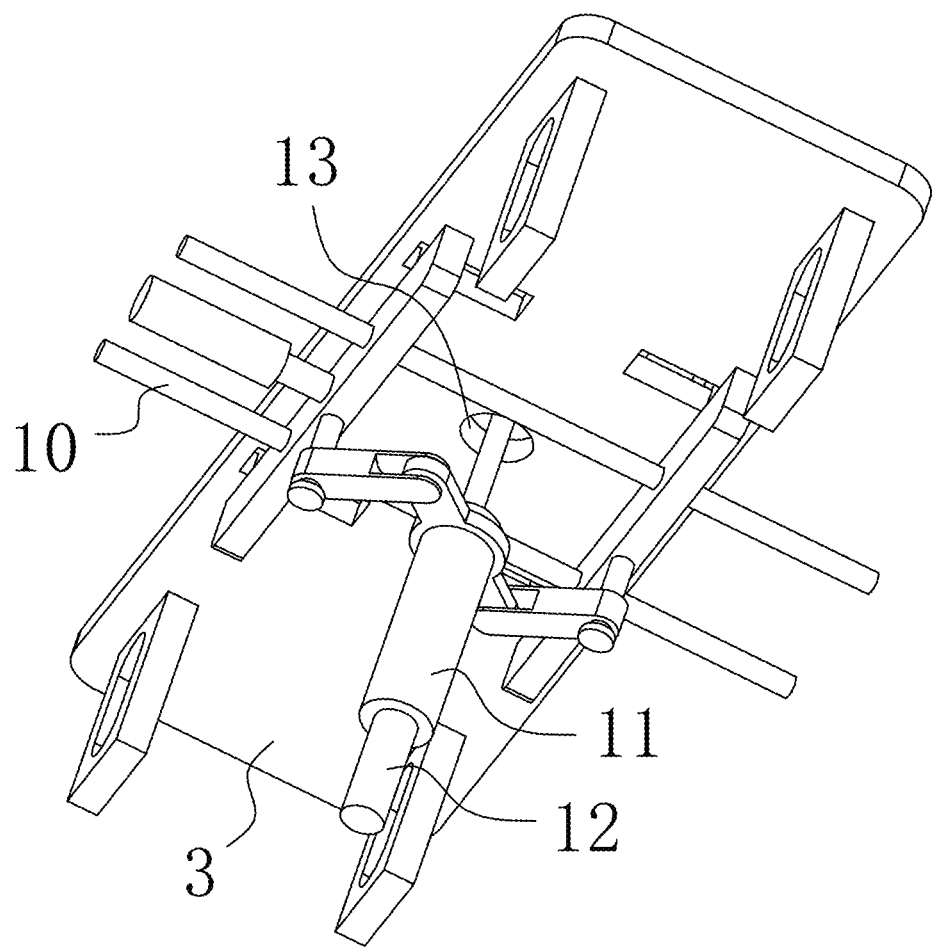
FIG. 11 is a structural bottom view of a console in a device for automatically extruding and installing an electromagnetic-loaded interference threaded connection component proposed by the disclosure.

Referring to FIG. 7-FIG. 8, the impact assembly 7 includes an annular plate 71, and a top of the annular plate 71 is fixedly connected with a threaded sleeve 72 inserted into the installing hole 65; a bottom of the annular plate 71 is provided with at least three hidden openings, and an outer surface of the annular plate 71 is provided with three movable grooves 73; the bottom of the annular plate 71 is fixedly connected with three abutting rods 74, and positioning pieces are arranged in the three movable grooves 73.

The arrangement of the threaded sleeve 72 is used to screw into the installing hole 65 on the electromagnetic-loaded assembly 6, so that the impact assembly 7 and the impact end of the electromagnetic-loaded assembly is detachably installed, which is convenient for workers to replace different types of impact assemblies 7 according to different types of high lock bolts 14, and has good disassembly and replacement functions;

The arrangement of three positioning pieces is used to elastically position and clamp the end cap part of the high lock bolt 14 to ensure the stability of the high lock bolt 14. Through the arrangement of the three abutting rods 74, the end cap part of the high lock bolt 14 used for positioning and clamping is abutted to ensure that the high lock bolt 14 is vertically downward, and the problem that the high lock bolt 14 is inclined is avoided.

As shown in FIG. 7-FIG. 8, each of the positioning pieces includes a rotating shaft 75 rotating in each of the movable groove 73; an outer surface of the rotating shaft 75 is fixedly connected with a T-shaped block 76; a bottom of the T-shaped block 76 is fixedly connected with a V-shaped positioning block 77; a rotating end of the rotating shaft 75 is provided with a torsion spring.

The T-shaped block 76 is driven to turn down by the torsion spring, and then the V-shaped positioning block 77 is driven to turn down; when the T-shaped block 76 is turned down, the protruding part on one side of the T-shaped block 76 will be inserted into the hidden opening; the hole of the annular plate 71 is shielded by the protruding parts of the three T-shaped blocks 76, which is convenient for the impact of the T-shaped impact rod 66 in the electromagnetic-loaded assembly 6.

The downward impact of the T-shaped impact rod 66 may extrude the protruding parts of the three T-shaped blocks 76, so that the three T-shaped blocks 76 are reversed and lose the positioning and clamping of the end cap of the high lock bolt 14; and the inner surfaces of the three V-shaped positioning blocks 77 are all arc-shaped, so that the high lock bolt 14 is smoothly separated from the three V-shaped positioning blocks 77 during impact loading.

By turning the three V-shaped positioning blocks 77 downward, the end cap part of the high lock bolt 14 is positioned and clamped, which not only ensures the stability of the high lock bolt 14, but also facilitates the coincidence of the high lock bolt 14 and the connecting holes on the overlapping plate group 4, and improves the positioning of the subsequent extrusion installing.

Figure 12:
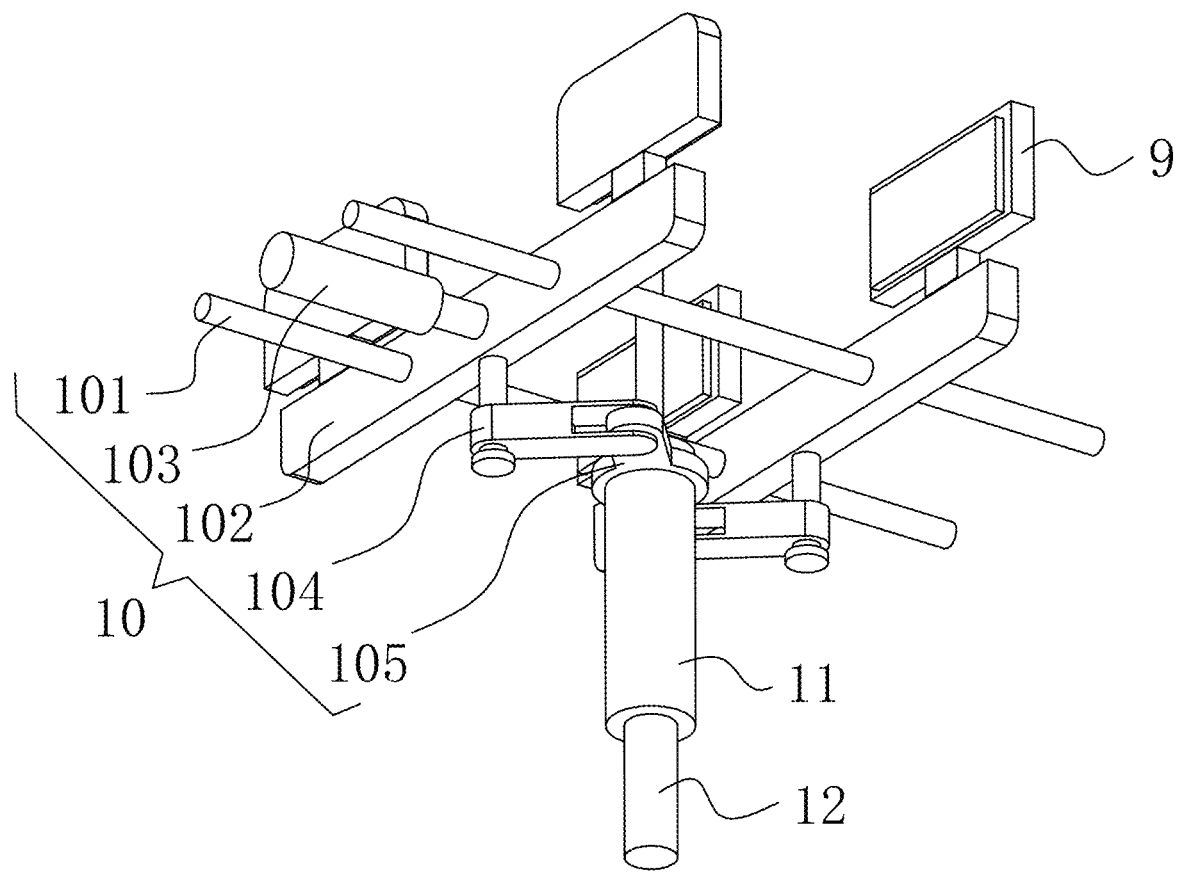
FIG. 12 is a schematic structural diagram of a driving assembly in a device for automatically extruding and installing an electromagnetic-loaded interference threaded connection component proposed by the disclosure.

As shown in FIG. 12, the driving assembly 10 includes two guiding rods 101 fixed between the two sides of the inner wall of the U-shaped frame 2, and two sliding frames 102 are slidably connected between the outer surfaces of the two guiding rods 101; the tops of the two sliding frames 102 are respectively fixedly connected with the bottoms of the two groups of clamping plates 9; there are two groups of chutes for the horizontal sliding of the sliding frame 102 in the console 3. One side of the inner wall of the U-shaped frame 2 is fixedly connected with a second electric telescopic rod 103, and the telescopic end of the second electric telescopic rod 103 is fixedly connected with one of the sliding frames 102; a connecting frame 104 is rotatably connected to the bottom of the two sliding frames 102, and a conversion plate 105 is hinged between one end of the two connecting frames 104. The conversion plate 105 rotates on the outer surface of the sleeve 11.

The second electric telescopic rod 103 is connected with an external power supply and a control switch for driving one of the sliding frames 102 to slide horizontally; a connecting frame 104 is rotatably connected to the bottom of the two sliding frames 102, and a conversion plate 105 is hinged between the two connecting frames 104, so that one of the sliding frames 102 may drive one of the connecting frames 104 to move in a fan shape when sliding; and through the arrangement of the conversion plate 105, the fan-shaped motion force is transmitted to another connecting frame 104 to form a fan-shaped motion, and finally the other sliding frame 102 is driven to move horizontally, and the two sliding frames 102 slide symmetrically.

Through the relative movement of the two sliding frames 102, two groups of clamping plates 9 is driven to move in the opposite direction, so as to clamp and reinforce the whole body on both sides of the overlapping plate group 4, improve the stability of extrusion installing, and synchronously drive the two groups of clamping plates 9, which not only avoids the installing of multiple electric drivers, but also improves the synchronization of fastening the overlapping plate group 4, and prevents the center of the connecting hole on the fastened overlapping plate group 4 from overlapping with the through hole 13, thus affecting the high lock.

The disclosure also relates to a method for automatically extruding and installing an electromagnetic-loaded interference threaded connection component, including following steps:

S1, firstly, stacking two overlapping plates or three overlapping plates to be extruded and installed, overlapping the connecting holes on multiple overlapping plates to form an overlapping plate group 4, and driving the sliding block 121 to be inserted into the connecting holes by overlapping multiple the overlapping plates through the telescopic cylinder 123 for positioning;

S2, driving two groups of clamping plates 9 to move in opposite directions through a driving assembly 10, clamping and reinforcing a whole body at both sides of the overlapping plate group 4, and after clamping and fixing, driving the positioning rod 122 to retract downwards and hide through the telescopic cylinder 123;

S3, inserting an end cap part of a high lock bolt required for an extrusion installing into an impact assembly 7, and driving a T-shaped block 76 to turn down through an arrangement of a torsion spring, thereby driving a V-shaped positioning block 77 to turn down to position and clamp the end cap part of the high lock bolt;

S4, driving a lifting plate 5 to move downwards through two first electric telescopic rods 15, and further driving an electromagnetic-loaded assembly 6 and two reinforcing assemblies 8 to move downwards; through downward movement of the two reinforcing assemblies 8, further positioning and clamping a position of the extrusion installing of the overlapping plate group 4, and inserting a threaded section of the high lock bolt 14 into the connecting hole on the overlapping plates; and S5, finally, charging the capacitor with required voltage through a cable, and inducing eddy current by a loading coil 68 when discharging to form a magnetic field; by using electromagnetic repulsion generated between the loading coil 68 and an induction coil 69, moving the induction coil 69 and an impact head 64 downward to form millisecond impact loading; finally, performing the extrusion installing of the high locking bolt 14 in the impact assembly 7 in the connecting holes on the overlapping plate group 4, so as to form an installing work of the electromagnetic-loaded interference threaded connection component.

The working principle of a device for automatically extruding and installing an electromagnetic-loaded interference threaded connection component is as follows:

S1, firstly, two overlapping plates or three overlapping plates to be extruded and installed are stacked to form an overlapping plate group 4, and during the stacking process, the connecting holes on multiple overlapping plates are overlapped, the telescopic cylinder 123 is stated to drive the sliding block 121 to move up and down; through the upward movement of the sliding block 121, the positioning rod 122 is driven to be inserted into the overlapping connecting holes of multiple overlapping plates through the through hole 13 for positioning;

S2, by starting the second electric telescopic rod 103, one of the sliding frames 102 is driven to slide horizontally, and the bottom of both sliding frames 102 are connected with a connecting frame 104 in a rotating way, and a conversion plate 105 is hinged between the two connecting frames 104, so that one sliding frame 102 may drive the other sliding frame 102 to move horizontally when sliding; and the two sliding frames 102 slide symmetrically, so that the two groups of clamping plates 9 are driven to move in the opposite direction through the movement of the two sliding frames 102 in the opposite direction, thereby clamping and reinforcing the whole body on both sides of the overlapping plate group 4; after clamping and fixing, through the telescopic cylinder 123 drives the positioning rod 122 to retract and hide;

S3, the end cap part of the high lock bolt 14 required for extrusion installing is inserted into the impact assembly 7, and through the arrangement of the torsion spring, the T-shaped block 76 is driven to turn down, and then the V-shaped positioning block 77 is driven to turn down; the end cap part of the high lock bolt 14 is positioned and clamped by the downward turning of the three V-shaped positioning blocks 77 to ensure the positioning and verticality;

S4, the lifting plate is driven to move up and down by starting the two first electric telescopic rods 15, and the electromagnetic-loaded assembly 6 and the two reinforcing assemblies 8 are driven to move down by the downward movement of the lifting plate; through the downward movement of the two reinforcing assemblies 8, the overlapping plate group 4 is further positioned and clamped, and the downward movement of the electromagnetic-loaded assembly 6 may make the high lock bolt 14 located in the connecting holes on the overlapping plates; and S5, finally, the input power is boosted by the boosting transformer and rectified by the rectifier element to charge the capacitor; after reaching the specified voltage, the discharge switch is closed, and the loading coil 68 is discharged through the cable; the electromagnetic repulsion generated between the loading coil 68 and the induction coil 69 moves the induction coil 69 and the impact head 64 downward to form millisecond impact loading; through the downward movement of the impact head 64, the high lock bolt 14 in the impact assembly 7 is extruded and installed in the connecting hole of the overlapping plate group 4, thus forming the extrusion installing of multiple overlapping plates.

Embodiment 2

Figure 4:
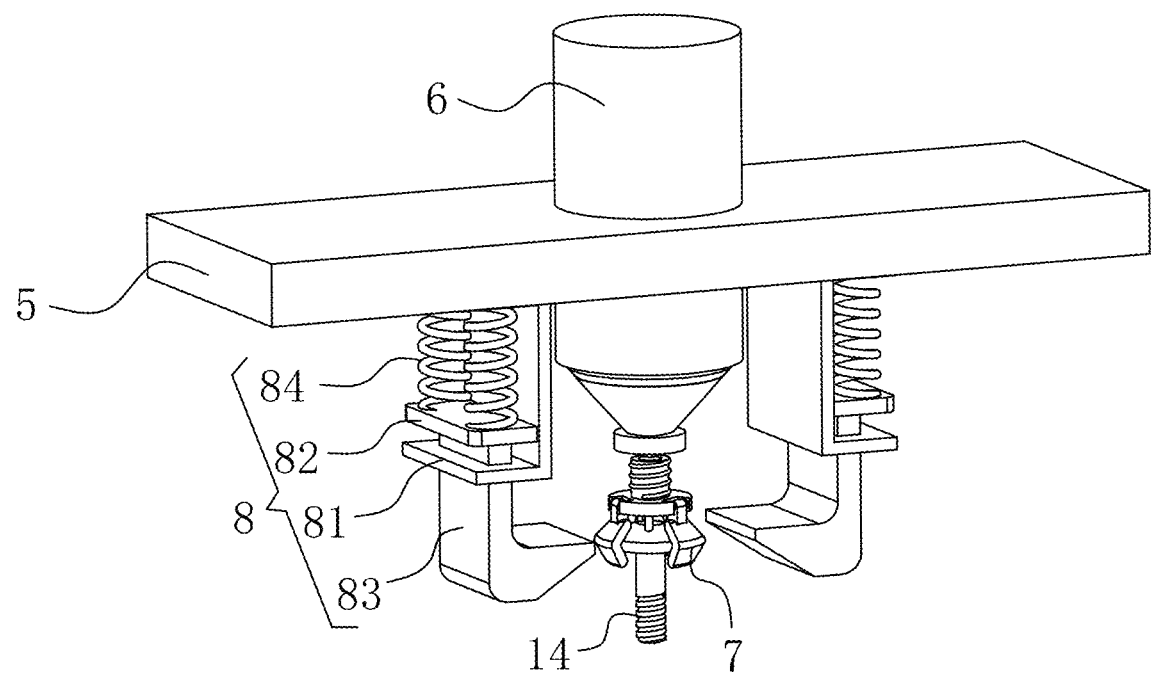
FIG. 4 is a schematic structural diagram of a lifting plate in a device for automatically extruding and installing an electromagnetic-loaded interference threaded connection component.
Figure 5:
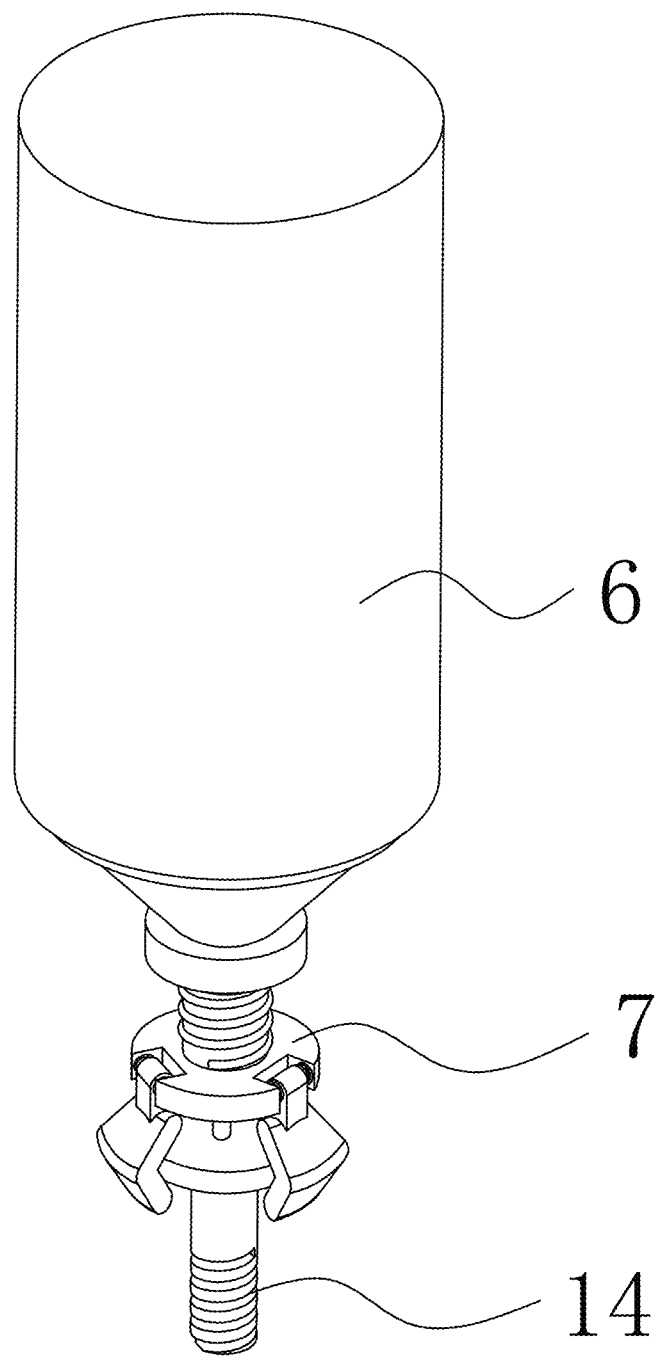
FIG. 5 is a schematic assembly diagram of an electromagnetic-loaded assembly and an impact assembly in a device for automatically extruding and installing an electromagnetic-loaded interference threaded connection component proposed by the disclosure.

Different from Embodiment 1 as shown in FIG. 4, each of the reinforcing assemblies 8 includes a U-shaped frame 81 fixed on a side of the bottom of the lifting plate 5; an inside of the U-shaped frame 81 is slidably connected with a moving block 82, and a bottom of the moving block 82 is fixedly connected with an L-shaped reinforcing block 83; a bottom of the L-shaped reinforcing block 83 extends to a bottom of the U-shaped frame 81, and one side of the L-shaped reinforcing block 83 is set as an inclined surface; a compression spring 84 is fixedly connected between a top of the moving block 82 and a top of an inner wall of the U-shaped frame 81.

The moving block 82 is extruded by the elastic force of the compression spring 84, so that the moving block 82 moves downwards, and the L-shaped reinforcing block 83 is driven to move downwards by the downward movement of the moving block 82. The L-shaped reinforcing block 83 is used for pressing the connection position of the combined overlapping plate group 4, so as to avoid the deviation of the overlapping plate group 4 in the squeezing installing process and affect the squeezing installing effect. Because one side of the two L-shaped reinforcing blocks 83 is set as an inclined surface, it is convenient to form a mutual squeezing force on both sides of the overlapping plate group 4 during the pressing process, so as to ensure the stability of two overlapped overlapping plates.

There are two reinforcing assemblies 8, which are symmetrically installed at the bottom of the lifting plate 5, so that when the lifting plate moves downwards, the electromagnetic-loaded assembly 6 and the two reinforcing assemblies 8 are all driven to move downwards, so that both sides of the installing position of the overlapping plate group 4 are pressed and positioned by the two reinforcing assemblies 8, so as to avoid the offset of the overlapping plate group 4 in the extrusion installing process and affect the extrusion installing effect, further improve its extrusion installing positioning and reduce the extrusion installing error.

Embodiment 3

Figure 13:
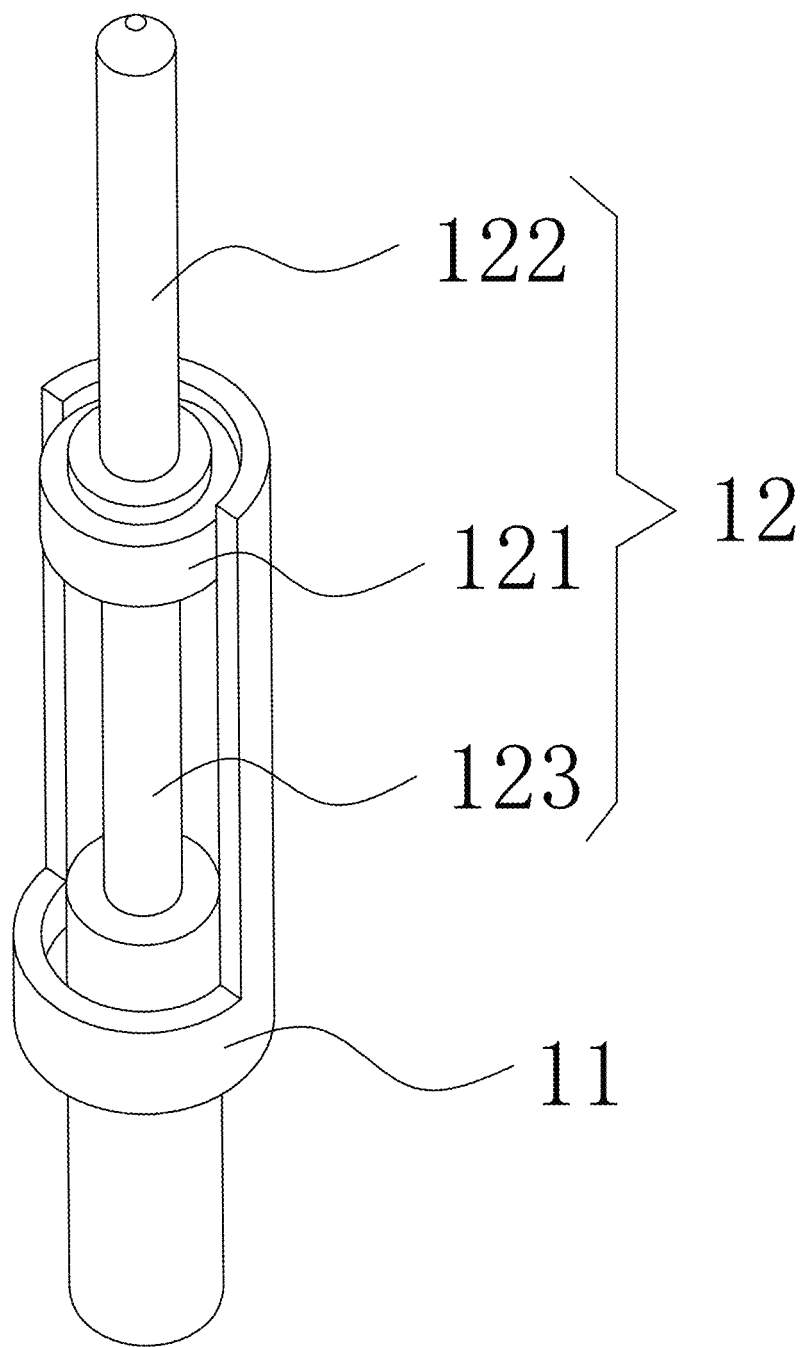
FIG. 13 is a schematic structural diagram of a positioning assembly in a device for automatically extruding and installing an electromagnetic-loaded interference threaded connection component proposed by the disclosure.

Different from Embodiment 1 as shown in FIG. 13, the positioning assembly 12 includes a sliding block 121 sliding inside the sleeve 11; a top of the sliding block 121 is detachably provided with a positioning rod 122; a top end of the positioning rod 122 extends to an outside of the sleeve 11, and the top end of the positioning rod 122 is arranged in a chamfered shape; a bottom of the sleeve 11 is fixedly connected with a telescopic cylinder 123, and a telescopic end of the telescopic cylinder 123 is fixedly connected with a bottom of the sliding block 121; and the top of the sliding block 121 is provided with a threaded hole, and a bottom of the positioning rod 122 is provided with external threads.

The diameter of the positioning rod 122 is equal to the inner diameter of the connecting holes on the overlapping plate group 4, and is used for overlapping and positioning the connecting holes on the overlapping plate group 4 to ensure the stability of subsequent installing. And the positioning rod 122 is detachably installed with the sliding block 121, so that workers may conveniently replace different types of positioning rods 122 according to the inner diameters of the connecting holes of different overlapping plate groups 4, and the positioning processing of different types of overlapping plate groups 4 is met; the bottom end of the positioning rod 122 is just screwed into the threaded hole at the top of the sliding block 121, so as to form the threaded installing of the positioning rod 122, and conversely, the positioning rod 122 is disassembled.

The telescopic cylinder 123 is connected with an external power supply and a control switch for driving the sliding block 121 to move up and down; the up-and-down movement of the sliding block 121 may drive the positioning rod 122 to move up and down; through the upward movement of the positioning rod 122, the positioning rod 122 is inserted into the connecting hole of the overlapping plate group 4 through the through hole 13 to form the positioning treatment, and on the contrary, the positioning rod 122 is retracted downward into the sleeve 11, thus facilitating the installing of the overlapping plate group 4.

It should be noted that the term "including" or any other variation thereof is intended to cover non-exclusive inclusion, so that a process, method, article or equipment including a series of elements includes not only those elements, but also other elements not explicitly listed, or elements inherent to such process, method, article or equipment. Without further restrictions, an element defined by the phrase "including one" does not exclude the existence of other identical elements in the process, method, article or equipment including the element.

Although embodiments of the present disclosure have been shown and described, it will be understood by those skilled in the art that various changes, modifications, substitutions and variations may be made to these embodiments without departing from the principles and spirit of the present disclosure, the scope of which is defined by the appended claims and their equivalents.

What is claimed is:

1. A device for automatically extruding and installing an electromagnetic-loaded interference threaded connection component, comprising: a base (1), wherein a U-shaped frame (2) and a console (3) are fixedly connected at a top of the base (1); the console (3) is located inside the U-shaped frame (2), and an overlapping plate group (4) is stored at a top of the console (3); a front of the U-shaped frame (2) is provided with a control panel, a lifting plate (5) is connected between two sides of an inner wall of the U-shaped frame (2) in a sliding way, an electromagnetic-loaded assembly (6) is arranged on the lifting plate (5), both sides of a top of the U-shaped frame (2) are fixedly connected with first electric telescopic rods (15), and telescopic ends of the two first electric telescopic rods (15) are fixed on a top of the lifting plate (5); wherein an impact end of the electromagnetic-loaded assembly (6) is detachably provided with an impact assembly (7) for positioning a high lock bolt (14), and both sides of a bottom of the lifting plate (5) are provided with reinforcing assemblies (8) for fastening the overlapping plate group (4) located on the console (3); clamping plates (9) for clamping two sides of the overlapping plate group (4) are slidably connected to both sides of the top of the console (3), and a bottom of the U-shaped frame (2) is provided with a driving assembly (10) for horizontally driving two groups of the clamping plates (9); an inside of the base (1) is fixedly connected with a sleeve (11), and an inside of the sleeve (11) is provided with a positioning assembly (12) for positioning connecting holes on the overlapping plate group (4); the console (3) is internally provided with a through hole (13), and the electromagnetic-loaded assembly (6) comprises a housing (61) fixed in the lifting plate (5); a movable plate (62) and a driving plate (63) are respectively arranged in the housing (61), and an impact head (64) is installed at a bottom of the driving plate (63); a bottom of the impact head (64) is provided with a installing hole (65), and an inside of the installing hole (65) is provided with internal threads; an inner surface of the installing hole (65) is fixedly connected with a T-shaped impact rod (66), and a bottom end of the T-shaped impact rod (66) extends to a bottom of the installing hole (65); a tension spring (67) is fixedly connected between a top of the T-shaped impact rod (66) and a top of the installing hole (65); opposite sides of the movable plate (62) and the driving plate (63) are respectively provided with a loading coil (68) and an induction coil (69), and a plurality of buffers (610) are arranged between a top of the movable plate (62) and a top of an inner wall of the housing (61); an inside of the impact head (64) is provided with a guiding groove (611); an inside of the guiding groove (611) is connected with a guiding plate (612) in a sliding way, and a top of the guiding plate (612) is fixedly connected with a guiding rod (613); a top end of the guiding rod (613) is fixed on the top of the inner wall of the housing (61); the impact assembly (7) comprises an annular plate (71), and a top of the annular plate (71) is fixedly connected with a threaded sleeve (72) inserted into the installing hole (65); a bottom of the annular plate (71) is provided with at least three hidden openings, and an outer surface of the annular plate (71) is provided with three movable grooves (73); the bottom of the annular plate (71) is fixedly connected with three abutting rods (74), and positioning pieces are arranged in the three movable grooves (73); each of the positioning pieces comprises a rotating shaft (75) rotating in each of the movable groove (73); an outer surface of the rotating shaft (75) is fixedly connected with a T-shaped block (76); a bottom of the T-shaped block (76) is fixedly connected with a V-shaped positioning block (77); a rotating end of the rotating shaft (75) is provided with a torsion spring.

2. The device for automatically extruding and installing the electromagnetic-loaded interference threaded connection component according to claim 1, wherein each of the reinforcing assemblies (8) comprises a U-shaped frame (81) fixed on a side of the bottom of the lifting plate (5); an inside of the U-shaped frame (81) is slidably connected with a moving block (82), and a bottom of the moving block (82) is fixedly connected with an L-shaped reinforcing block (83); a bottom of the L-shaped reinforcing block (83) extends to a bottom of the U-shaped frame (81), and one side of the L-shaped reinforcing block (83) is set as an inclined surface; a compression spring (84) is fixedly connected between a top of the moving block (82) and a top of an inner wall of the U-shaped frame (81).

3. The device for automatically extruding and installing the electromagnetic-loaded interference threaded connection component according to claim 2, wherein the positioning assembly (12) comprises a sliding block (121) sliding inside the sleeve (11); a top of the sliding block (121) is detachably provided with a positioning rod (122); a top end of the positioning rod (122) extends to an outside of the sleeve (11), and the top end of the positioning rod (122) is arranged in a chamfered shape; a bottom of the sleeve (11) is fixedly connected with a telescopic cylinder (123), and a telescopic end of the telescopic cylinder (123) is fixedly connected with a bottom of the sliding block (121); and the top of the sliding block (121) is provided with a threaded hole, and a bottom of the positioning rod (122) is provided with external threads.

\* \* \* \* \*